(12) United States Patent
Hall et al.

(10) Patent No.: US 7,105,249 B2
(45) Date of Patent: Sep. 12, 2006

(54) PRESSURE-COMPENSATED DOWNHOLE BATTERY

(76) Inventors: David R. Hall, 2185 S. Larsen Pkwy., Provo, UT (US) 84606; Joe R. Fox, 2185 S. Larsen Pkwy., Provo, CT (US) 84606

( * ) Notice: Subject to any disclaimer, the term of this patent is extended or adjusted under 35 U.S.C. 154(b) by 410 days.

(21) Appl. No.: 10/633,819

(22) Filed: Aug. 4, 2003

(65) Prior Publication Data

US 2004/0248001 A1 Dec. 9, 2004

Related U.S. Application Data

(63) Continuation-in-part of application No. 10/453,290, filed on Jun. 3, 2003.

(51) Int. Cl.
*H01M 2/04* (2006.01)
*H01M 10/00* (2006.01)
*H01M 2/02* (2006.01)

(52) U.S. Cl. ............... 429/176; 429/127; 429/164; 429/178

(58) Field of Classification Search ............... 429/176, 429/127, 164, 178
See application file for complete search history.

(56) References Cited

U.S. PATENT DOCUMENTS

| | | | |
|---|---|---|---|
| 2,654,960 A | | 10/1953 | Hewitt |
| 3,553,018 A | * | 1/1971 | Daniels, Jr. et al. ............ 429/6 |
| 4,109,062 A | | 8/1978 | McCartney |
| 5,326,652 A | * | 7/1994 | Lake ............................ 429/127 |
| 5,451,881 A | * | 9/1995 | Finger ......................... 324/433 |
| 5,516,603 A | * | 5/1996 | Holcombe ................... 429/127 |
| 5,521,794 A | * | 5/1996 | Hargrave et al. ............ 361/814 |
| 5,747,964 A | * | 5/1998 | Turnbull ...................... 320/124 |
| 6,007,932 A | * | 12/1999 | Steyn .......................... 429/31 |
| 6,187,469 B1 | | 2/2001 | Marincic |
| 6,392,317 B1 | | 5/2002 | Hall et al. |
| 6,528,204 B1 | * | 3/2003 | Hikmet et al. ............... 429/128 |
| 6,705,406 B1 | * | 3/2004 | Das et al. .................... 166/381 |
| 2004/0248000 A1 | | 12/2004 | Hall et al. |
| 2004/0248001 A1 | | 12/2004 | Hall et al. |
| 2004/0265682 A1 | | 12/2004 | Hudson |

* cited by examiner

*Primary Examiner*—Patrick Joseph Ryan
*Assistant Examiner*—Thomas H. Parsons
(74) *Attorney, Agent, or Firm*—Daniel P. Nelson; Tyson J. Wilde (57) ABSTRACT

A pressure-balanced battery for powering downhole-drilling components and a downhole telemetry network in a subterranean environment includes a battery and a housing enclosing and sealing a volume containing the battery. At least a portion of the housing is expandable and contractible to enable pressure encountered downhole to balance pressure internal to the housing. In this way, the thermal range of a battery's operation may be increased to function in a downhole environment. In selected embodiments, the housing is in operable communication with downhole fluids to transfer pressure to the battery. In selected embodiments, the battery is integrated into the annular structure of an existing downhole tool. In other embodiments, the battery may be integrated into a downhole tool specifically dedicated for use as a battery.

21 Claims, 8 Drawing Sheets

PRESSURE-COMPENSATED DOWNHOLE BATTERY

CROSS-REFERENCE TO RELATED APPLICATIONS

This application is a continuation-in-part of co-pending U.S. application Ser. No. 10/453,290 which was filed on Jun. 3, 2003 and entitled Pressure-balanced Battery for Downhole Tools.

BACKGROUND OF THE INVENTION

1. The Field of the Invention

This invention relates to primary and secondary batteries for use downhole for powering a telemetry network and other downhole tools. More specifically, this invention relates to a battery or a fuel cell having internal components that are pressurized to the ambient pressure found downhole, to depths of 20,000 feet or more, in order to compensate for downhole thermal conditions above 120° C.

2. The Relevant Art

At depths of 20,000 feet or more, temperature and pressure may reach levels of 200° C. and 10,000 PSI, respectively, providing a hostile environment to downhole drilling components. Moreover, as drilling methods and equipment become more advanced and accurate, newer and more advanced components are continuously being upgraded to perform various functions. Since reliable power may not be readily transmitted to downhole drilling environments, batteries may be used to provide power to various components. Nevertheless, very few batteries are designed to operate in the types of conditions encountered downhole. Moreover, due to space constraints, very few batteries have the desired power densities and dimensions to fit within spaces available in downhole equipment.

For example, few if any batteries are known to operate at temperatures in excess of 170° C. The majority of batteries are designed to function in conditions below 100° C. Thus, very few batteries currently available may be used to provide reliable power sources to downhole drilling components. Thus, apparatus and methods are needed to provide reliable power to downhole components.

The factors affecting downhole pressure are generally the depth of drilling, the hardness and continuity of the subterranean formations being drilled, the composition of the drilling fluid being used, and the under-balanced condition maintained in the well bore. Similar factors are also relevant to the temperature in the well bore. Extreme pressure and thermal conditions in deep wells contribute to premature battery degradation in downhole applications.

Generally, downhole batteries are self-contained in their own sealed containers to protect them from ambient conditions, including high pressure and temperature. The need to protect battery components from external pressure may require an expensive pressure housing in the downhole tool. In addition, physical constraints imposed by the geometry of a downhole tool often means that a battery must intrude on the flow space within the tool, or it must be limited to relatively small diameters, reducing overall power density. Moreover, high-pressure housings are always subject to leakage that may lead to a catastrophic failure of a battery and may damage surrounding electronic components as well.

U.S. Pat. No. 6,187,469, to Marincie et al., incorporated herein by reference, is an example of a downhole battery system. Marincie et al. teaches individual cells mounted end to end and interlocked together to prevent rotation of cells relative to one another. The cells are electrically connected and mounted between an inner and outer tube. The housing for the battery is sufficiently strong to resist downhole pressures and is provided with vents for the discharge of gases.

U.S. Pat. No. 6,224,997, to Papadopoulos, incorporated herein by reference, teaches a flexible battery pack for powering downhole electronic equipment. The pack includes a plurality of electrochemical cells connected and tied together in a stacked relationship by a pair of semi-cylindrical encapsulating shells which form a primary containment for the cells. The shells comprise a glass fiber reinforced plastic material. The primary containment is sealed within a stainless steel tube that is provided to hold the components in place during operation. Electrical conductors are also provided to transmit energy from the battery to selected downhole equipment. Each cell is sealed to resist the downhole environment and a venting mechanism is provided.

U.S. Pat. No. 4,087,590, to Kraft, discloses a pressure-equalized electrochemical battery system. Kraft discloses a pack of ordinary, commercially available batteries that are provided with a common electrolyte-filled reservoir coupled to each battery by a small tube. The reservoir includes a compliant diaphragm which, when exposed to pressure, applies the pressure to the reservoir of electrolyte to force it into the battery. Forceful filling of the cells equalizes their internal and external pressures. Kraft is intended for deep-sea applications and would not meet the constraints of a downhole tool string.

U.S. Pat. No. 6,117,583, to Nilsson, discloses a battery that is intentionally pressurized, but is pressurized above ambient pressure. In lead-acid batteries, $PbSO_4$ that is formed during discharge has a higher volume than Pb and $PbO_2$ from which it is formed. When it is discharged, the shrinkage causes a loss of contact between active components and the current conducting lead frame. This is overcome by providing a strong housing that keeps the battery under high pressure.

U.S. Pat. No. 6,253,847, to Stephensen, discloses a permanent downhole power source for a producing well using a steel casing coated with iron oxide as a cathode. $Fe_2O_3$ is reduced to FeO. A separate piece of Zinc, as an anode, is provided which corrodes and is consumed. A cement treated with additives, to increase its conductivity, serves as an electrolyte.

In view of the foregoing, what is needed is a long life battery that will accommodate the temperature, pressure, and physical constraints of downhole tools and be functional to depths of 20,000 feet or more.

SUMMARY OF THE INVENTION

In view of the foregoing, it is a primary object of the present invention to provide a robust battery for supplying power to various downhole components, such as to downhole networking components, in the presence of hostile downhole conditions, such as high temperature, pressure, dirt, rocks, mud, fluids, lubricants, and the like. It is a further object of the invention to increase the thermal range of a battery's operation by transferring pressure encountered downhole to components within the battery.

Consistent with the foregoing objects, and in accordance with the invention as embodied and broadly described herein, in one embodiment in accordance with the invention, a pressure-balanced battery for powering downhole drilling components in a subterranean environment includes a battery and a housing enclosing and sealing a volume containing the battery. The housing may be expandable and contractible to balance pressure internal to the housing with pressure external to the housing.

In selected embodiments, the housing is in operable communication with downhole fluids to transfer pressure to the battery. In other embodiments, the housing is integrated into the annular structure of a downhole tool. In certain embodiments, a portion of the housing is machined, milled, cast, and forged into the structure of a downhole tool.

The battery may include one or several cells electrically connected in series, parallel, or a combination thereof, within the housing. The battery cells may be held together by a flexible casing having a substantially planar or flat shape, a cylindrical shape, a semi-cylindrical shape, or any other shape, as needed, to fit within the particular constraints imposed by the downhole tool.

One or several battery terminals may be connected to the battery and be accessible through an opening in the housing. The battery may include an electrolyte that is a fluid electrolyte, a solid electrolyte, or a combination thereof. In selected embodiments, the battery is a fuel cell. In selected embodiments, the battery may be installed into one or several recesses formed in the wall of a downhole tool.

The battery may be used to supply power to components of a downhole network, other downhole tools, transmission elements configured to transmit information between downhole tools, and the like. In selected embodiments, a signal-conditioning module may be provided with the battery to modify characteristics of power output from the battery. The battery may be a single-use battery or rechargeable.

In another aspect of the present invention, a pressure-balanced battery for powering downhole-drilling components in a subterranean environment includes a battery and a housing enclosing and sealing a volume containing the battery. The housing may include a substantially rigid portion and a resilient portion deformable to vary the volume of the housing. The resilient portion may balance pressure internal to the housing with ambient pressure external to the housing.

In selected embodiments, the resilient portion of the housing is in operable communication with downhole fluids. The housing may be integrated into the annular structure of a downhole tool. The rigid portion of the housing may be machined, milled, cast, forged, and the like, into the structure of a downhole tool.

In selected embodiments, the battery includes one or several cells electrically connected in series, parallel, or a combination thereof, within the housing. The battery may also include one or several battery terminals, operably connected to the battery, accessible through an opening in the housing.

In another aspect of the present invention, a method for providing power to downhole drilling components in a subterranean environment may include providing a battery, providing a sealed housing for the battery having a resilient portion flexible to vary the volume within the housing, and flexing the resilient portion to balance pressure internal to the housing with pressure external to the housing. In selected embodiments, the flexing of the resilient portion may be actuated by communication between downhole fluids and the resilient portion of the housing.

BRIEF DESCRIPTION OF THE DRAWINGS

The foregoing and other features of the present invention will become more fully apparent from the following description, taken in conjunction with the accompanying drawings. Understanding that these drawings depict only typical embodiments in accordance with the invention and are, therefore, not to be considered limiting of its scope, the invention will be described with additional specificity and detail through use of the accompanying drawings in which.

DETAILED DESCRIPTION OF THE INVENTION

It will be readily understood that the components of the present invention, as generally described and illustrated in the Figures herein, could be arranged and designed in a wide variety of different configurations. Thus, the following more detailed description of embodiments of apparatus and methods of the present invention, as represented in the Figures, is not intended to limit the scope of the invention, as claimed, but is merely representative of various selected embodiments of the invention.

The illustrated embodiments of the invention will be best understood by reference to the drawings, wherein like parts are designated by like numerals throughout. Those of ordinary skill in the art will, of course, appreciate that various modifications to the apparatus and methods described herein may easily be made without departing from the essential characteristics of the invention, as described in connection with the Figures. Thus, the following description of the Figures is intended only by way of example, and simply illustrates certain selected embodiments consistent with the invention as claimed herein.

Figure 1:
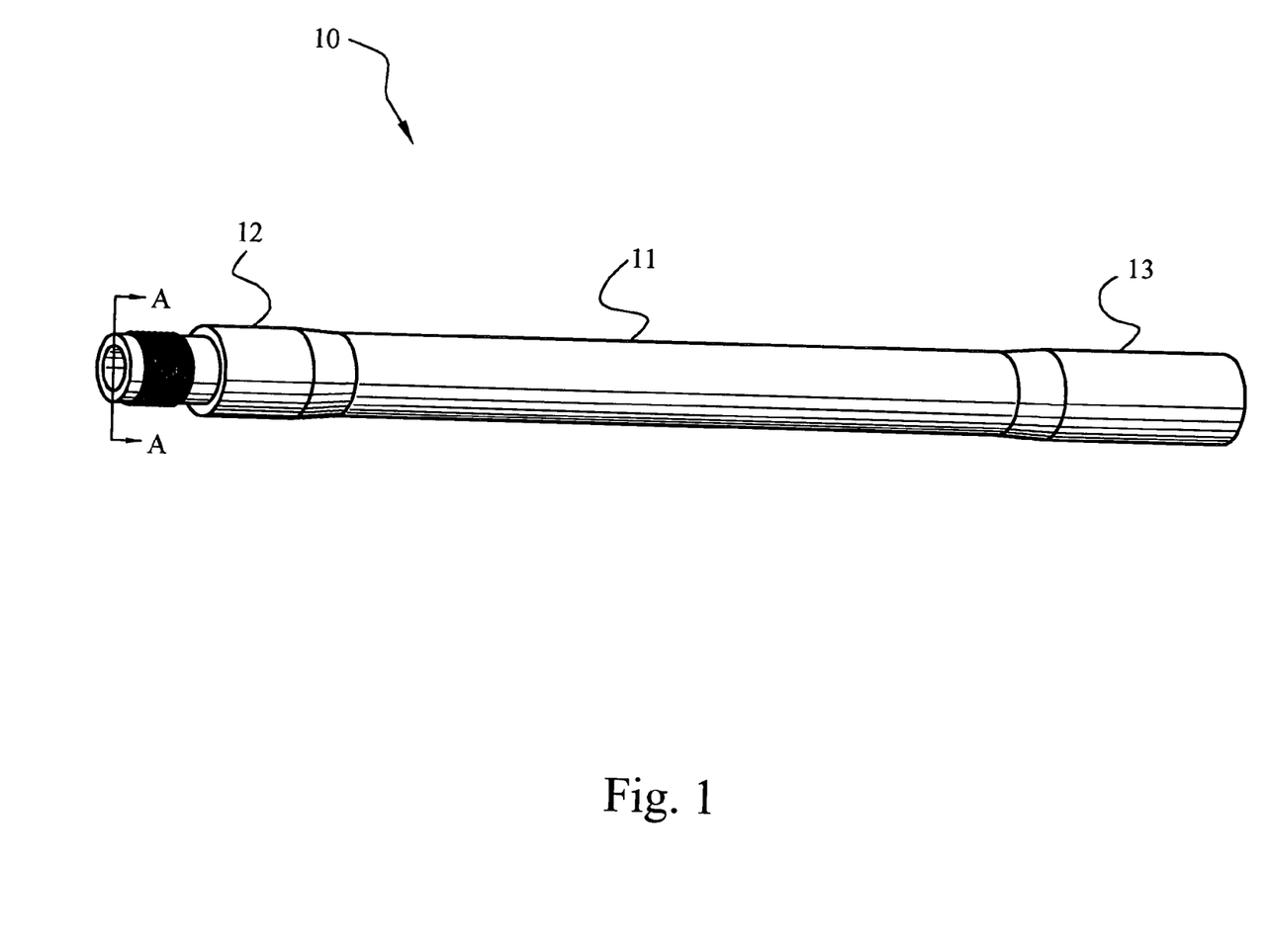
FIG. 1 is a perspective view illustrating one embodiment of a downhole tool, such as a section of drill pipe.

Referring to FIG. 1, a downhole tool 10 may generally be constrained to have a design or configuration similar to that illustrated. Thus, any desired functions, tools, sensors, or other features generally requires the design of such to operate within the dimensions and other constraints imposed by the downhole environment. In general, a downhole tool 10 may include a tubular tool body 11 having a pin end 12 and box end 13, providing tool joints 12, 13 for connecting to other downhole tools 10, such as other sections of drill pipe 10. Due to additional stresses imposed thereon, tool joints 12, 13 may include additional wall thickness or structure to reliably support the added stress. The pin end 12 and box end 13 may include an external and internal threaded portion, respectively, to thread into corresponding threaded portions of other similar downhole tools 10

Figure 2:
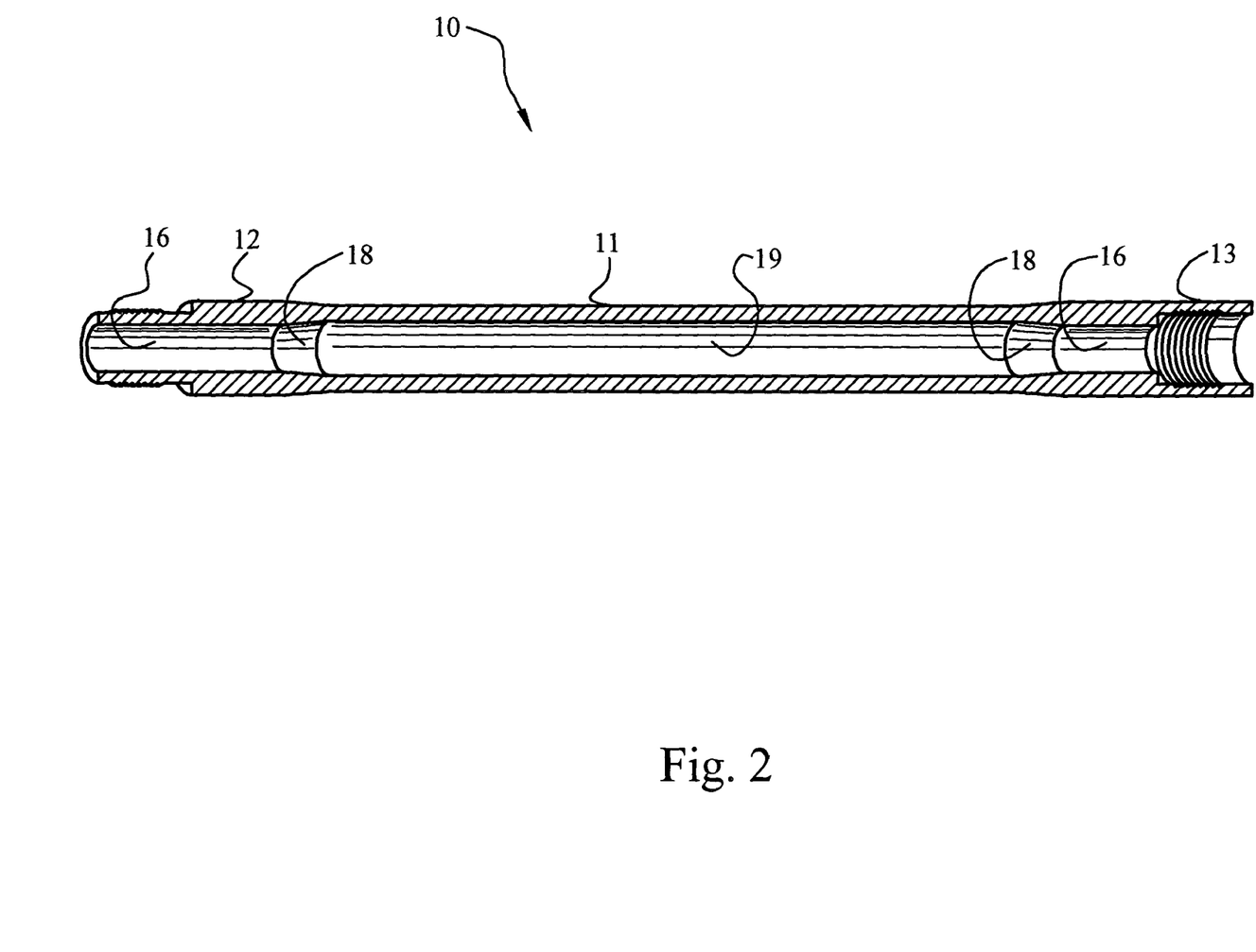
FIG. 2 is a perspective cross-sectional view of interior characteristics of one embodiment of a downhole tool as illustrated in FIG. 1.

Referring to FIG. 2, internally, a downhole tool 10 may include a central bore 19 running the length thereof. The central bore 19 may taper off at transition areas 18 to smaller diameter bores 16 passing through the tool joints 12, 13. The smaller diameter bores 16 may be provided to add structural support near the tool joints 12, 13.

The size of the central bore 19 and smaller bores 16 may be such as to enable mud or other drilling fluids to pass through the bores 16, 19 with a minimum level of restriction. In addition, the bores 16, 19 may generally require a certain diameter in order to lower tools or other components through the central bore down the drill string. Thus, batteries intended for function downhole generally are constrained to reside within the annular walls of a downhole tool 10 without overly compromising the strength of a downhole tool 10 and without restricting diameter requirements of the bores 16, 19.

As was previously mentioned, few if any batteries are designed to function within the constraints imposed by downhole tools 10 in a subterranean environment. Moreover, few if any batteries are designed to function in the hostile environment downhole characterized by temperatures of 200° C. or more, and pressures nearing or exceeding 10,000 PSI. Conditions that prevent batteries from functioning at such high pressures and temperatures may be understood by effects that occur under these conditions.

Most batteries function by creating electrical power from chemical reactions occurring within the battery. Substances and materials such as electrolytes and dielectric materials, whether they are in a solid or liquid form, are integral to the chemical reaction within a battery. At high temperatures, these materials may begin to boil, vaporize, outgas, or the like, thereby weakening or destroying operation of the battery.

Thus, if batteries are to survive and function in downhole environments, apparatus and methods are needed to prevent, reduce, or minimize the effects of boiling, vaporization, or outgassing of materials within a selected battery. Moreover, the battery should also have suitable dimensions and flexibility to function within the space constraints required by downhole tools 10.

In general, the temperature at which a liquid or solid boils, vaporizes, or outgases is directly related to the pressure of the surrounding environment. Thus, if pressure is increased, boiling or rates of outgassing may be shifted to occur at higher temperatures. If pressures encountered in downhole environments are applied to materials such as electrolytes or dielectrics found within selected batteries, boiling or outgassing that might otherwise result may be reduced or eliminated. Thus, batteries not designed to function in environments of high temperature and pressure, such as those experienced downhole, may be made to function in environments having temperatures nearing or exceeding 200° C. and pressures reaching or exceeding 10,000 PSI.

Figure 3:
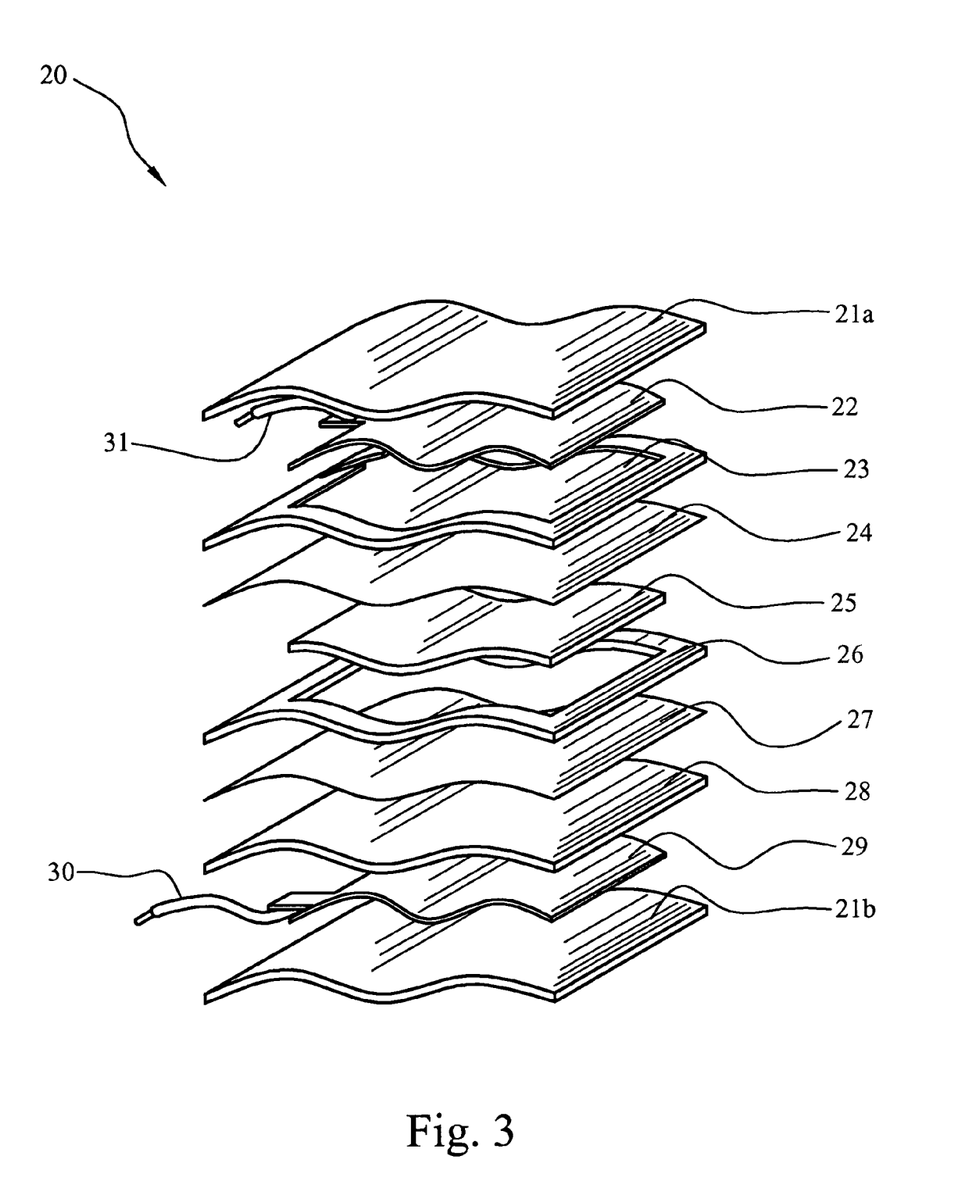
FIG. 3 is an exploded perspective view of one embodiment of a battery cell in accordance with the invention.

Referring to FIG. 3, in one embodiment, a battery cell 20 in accordance with the invention, may be designed to be relatively flat and flexible to fit within the constraints imposed by a downhole tool 10. Thus, a battery cell 20, as illustrated, may take on a relatively flat, rounded, or curved shape, as desired. In addition, selected batteries having higher power densities per volume may be more preferable for use in the present invention due to the space constraints. Nevertheless, any of the various known types of batteries, such as lithium-ion, nickel-cadmium, nickel-metal hydride, zinc-carbon, alkaline, silver-zinc, and the like, to name a few, or various types of fuel cells, are certainly within the scope of the present invention.

In one embodiment, a battery cell 20 such as a lithium-ion battery 20, may include a flexible casing 21a, 21b enclosing internal components of the battery cell 20. The battery cell 20 may include a positive copper foil 22 coated with an anode material to serve as a current collector, which may or may not be enclosed in an anode housing 23. In addition, the battery cell 20 may include various dielectric separators 24, 27, and an electrolyte layer 25 which may or may not be enclosed or protected by a housing 26. The battery cell 20 may also include a negative copper metal foil 29 coated with a cathode material to function as a negative current collector, which may or may not be enclosed in a housing 28. The battery cell 20 may also include a pair of positive and negative terminals 30, 31, or printed traces 30, 31, to supply power to other components from the battery cell 20. The battery cell 20 may be designed to function as a primary or secondary battery, meaning that the battery cell 20 may be a single-use battery, or may be rechargeable for multiple uses.

Other electrochemical power storage and generating systems may accommodate the constraints of a downhole system and be suitable for downhole use by exposing them to downhole pressure and temperature. All or part of such systems include liquid and solid state electrolyte systems as disclosed in U.S. Pat. No. 6,506,511, to Lakeman, and U.S. Pat. No. 6,528,204, to Hikmet, both of which are incorporated herein by reference. The electrochemical systems disclosed in these references are configured to be includible within the physical constraints of various downhole tools. Additionally, they demonstrate the breadth of electrolytic components that might benefit from being exposed to a downhole environment rather than being protected from it.

Figure 4:
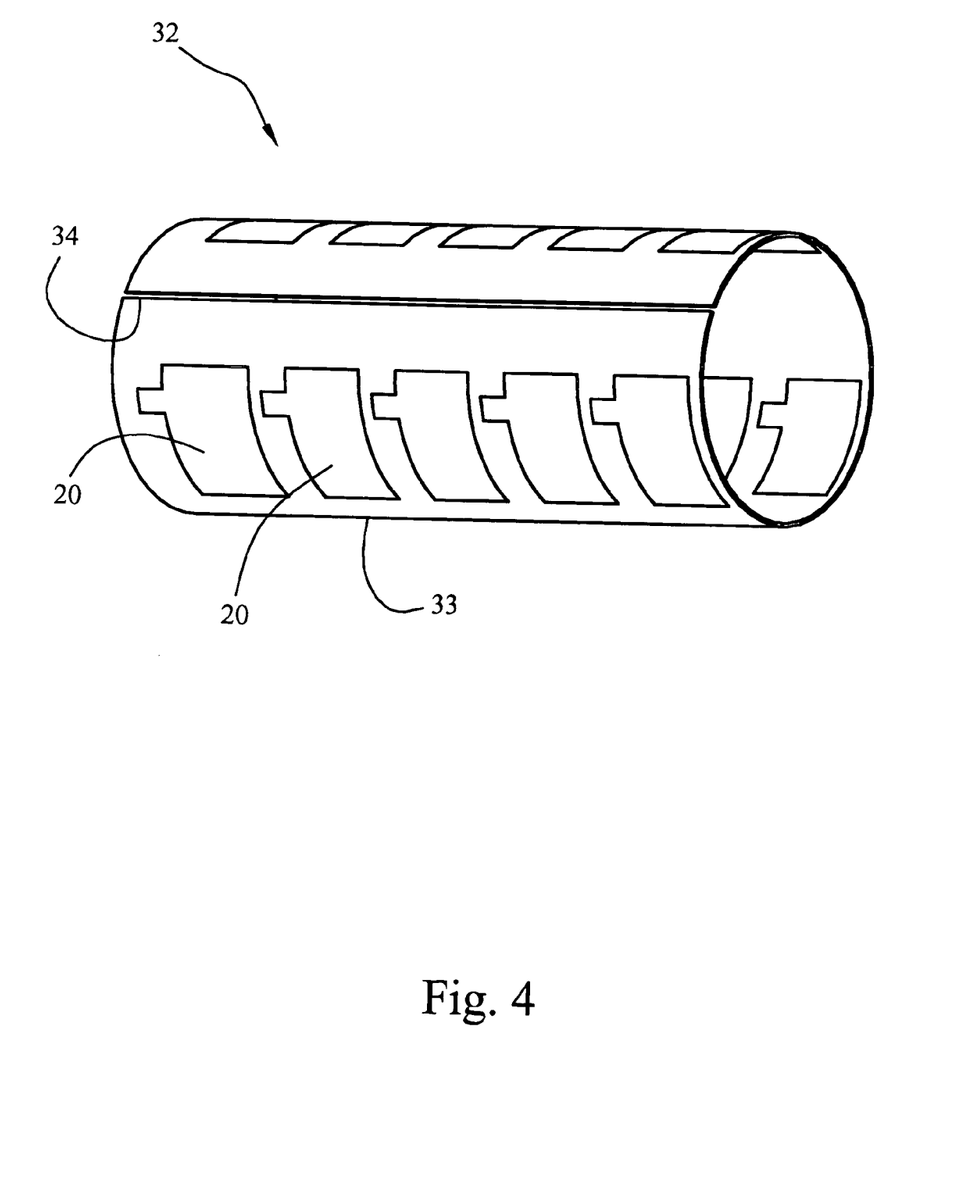
FIG. 4 is a perspective view illustrating one embodiment of a battery comprising multiple battery cells integrated into a cylindrical casing for integration into a downhole tool.

Referring to FIG. 4, in selected embodiments, battery cells 20, as illustrated in FIG. 3, may be combined into a matrix or array of battery cells 20 in order to provide desired voltage and power. For example, a battery 32 including multiple battery cells 20, may be combined into a matrix or array of battery cells 20 within a cylindrical casing 33. The cylindrical casing 33 may be constructed of any suitable material.

In selected embodiments, battery cells 20 may be encapsulated or sandwiched within the material of the cylindrical casing 33, or may be attached by any suitable means onto the exterior or interior surface thereof. In selected embodiments, the cylindrical casing 33 may be constructed of a material such as that used to construct various circuit boards. In this embodiment, metal traces (not shown) may be etched or otherwise attached to the cylindrical casing 33 to connect the battery cells 20 in series, parallel, or a combination thereof, in order to provide desired voltage and power characteristics to the battery 32.

In selected embodiments, the battery 32 may include a gap 34. The gap 34 may enable expansion or contraction of the diameter of the cylindrical casing 33 in order to insert the battery 32 into a downhole tool 10. Once the battery 32 is inserted into the downhole tool 10, the diameter of the cylindrical casing 33 may expand to fit snugly to the inside diameter of the downhole tool 10. The length of the cylindrical casing 33 may be adjusted as needed to provide more or less battery cells 20 to the battery 32.

Figure 5:
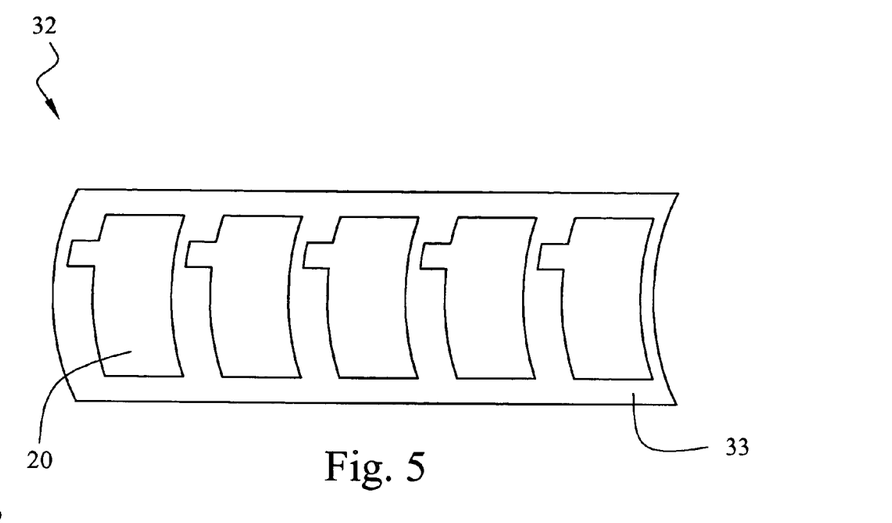
FIG. 5 is a perspective view illustrating another embodiment of a battery in accordance with the invention, having a semi-cylindrical shape.

Referring to FIG. 5, in a similar manner, a battery 32 may be designed to have any desired shape or configuration. For example, in selected embodiments, a battery 32 may be configured to have a rounded or semi-cylindrical shape. This shape may enable insertion or housing of the battery 32 within recesses formed in the annular walls of downhole tools 10. As was stated previously, the dimensions of the cylindrical or semi-cylindrical casing 33 may be varied as needed to fit within the particular constraints of a downhole tool 10, or to accommodate additional battery cells 20 to provide desired power or voltage.

Figure 6:
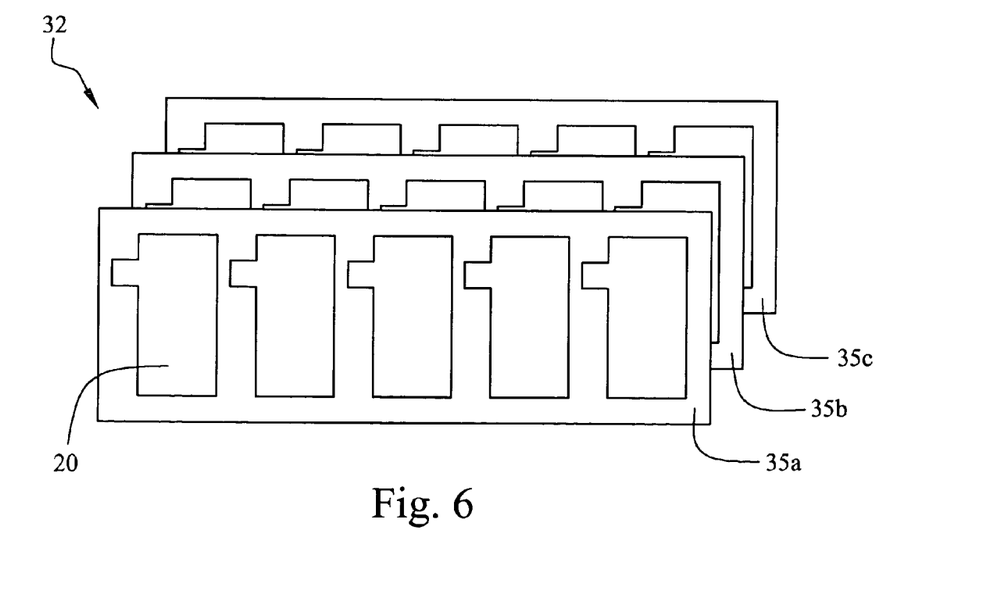
FIG. 6 is a perspective view illustrating one embodiment of a planar or flat implementation of a battery in accordance with the invention, having one or multiple layers.

Referring to FIG. 6, likewise, a battery 32 may include one or several layer 35a–c in a substantially planar or flat configuration. Providing cells 20 in layers 35a–c may enable stacking of the layers 35a–c to provide desired dimensions, thickness, and power density to the battery 32 in order to fit within space constraints of a downhole tool 10. In reality, the different configurations of batteries 32 illustrated in FIGS. 4–6 simply represent certain contemplated shapes of batteries 32 in accordance with the present invention. Many other shapes are possible and may be desirable depending on the design constraints. All of these are intended to be captured within the scope of the present invention.

Figure 7:
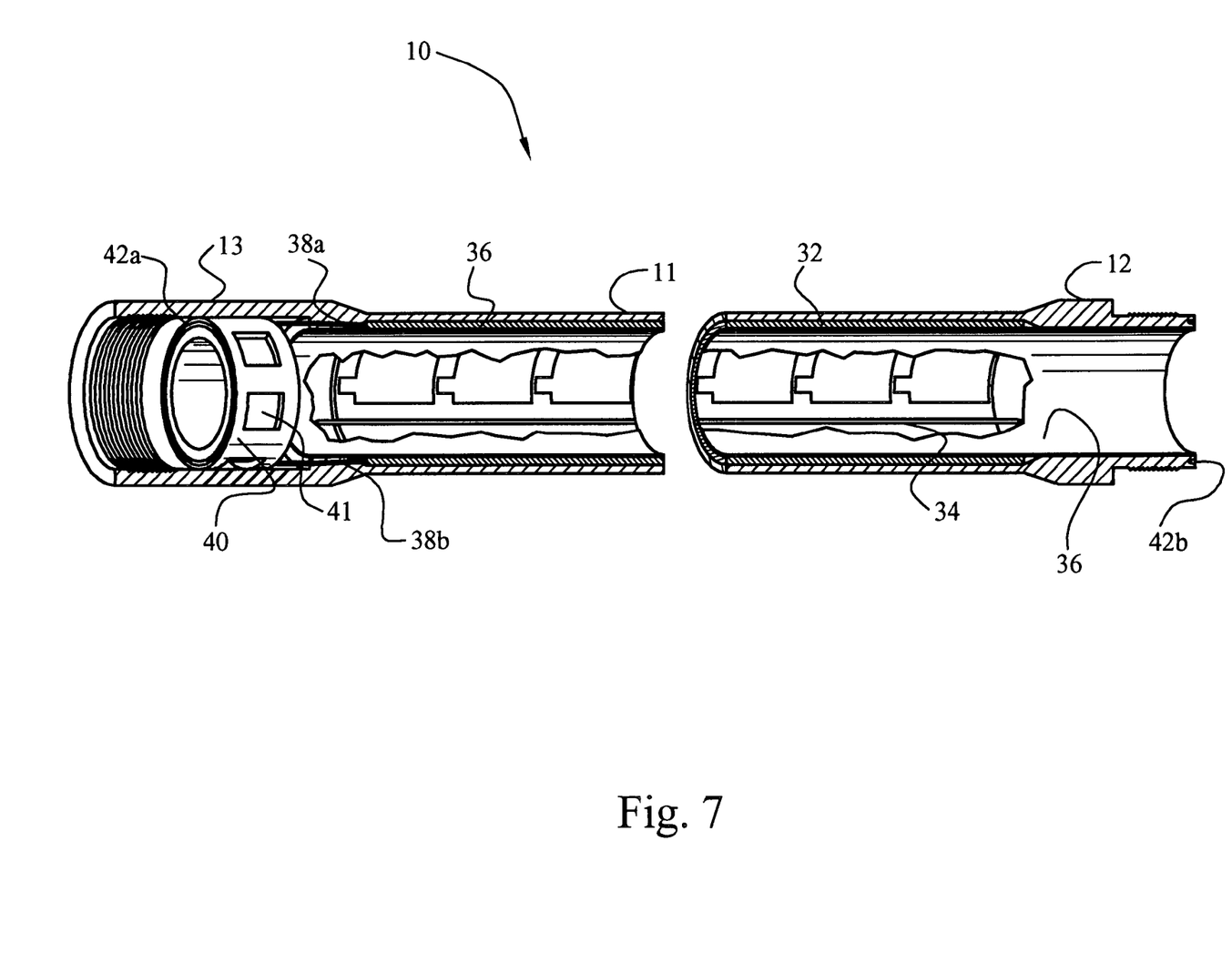
FIG. 7 is a perspective cross-sectional view illustrating one embodiment of a battery, having a cylindrical configuration, installed into a downhole tool.

Referring to FIG. 7, while continuing to refer generally to FIG. 4, a battery 32 having a cylindrical configuration may be housed within a downhole tool 10. The downhole tool 10 may be a tool 10 specifically dedicated as a battery, or may be a tool 10 having other functions or purposes that has a battery 32 integrated therein. A cylindrical battery 32 may be inserted or installed into the downhole tool 10 to sit against the inside wall or inside diameter of the tubular body 11.

In selected embodiments, a recess may be milled or formed on the inside wall of the tubular body 15 to accommodate the battery 32. A flexible or compliant liner 36, made of stainless steel, plastic, or some other suitable material capable of withstanding the rigors of a downhole environment, may be inserted into the inside diameter of the downhole tool 10 such as to sandwich the cylindrical battery 32 between the liner 36 and structure of the tubular body 11.

The liner 36 may be sufficiently flexible or compliant to transfer pressure within the inside diameter of the liner 36 to the battery 32. That is, the pressure of mud, air, or other drilling fluids traveling through the liner 36 may cause the diameter of the liner 36 to expand, thereby increasing pressure on the battery 32. By transferring pressure to the battery 32, the thermal operating range of the battery 32 may be increased by increasing the boiling point, vaporization, or outgassing temperature of dielectric materials, electrolytes, or other materials within the battery 32. Thus, a battery 32 which might not normally be operable at such pressures and temperatures, may function in a downhole environment.

In selected embodiments, one or multiple leads 38a, 38b may extend from the battery 32. In selected embodiments, the leads 38a, 38b may feed power to a signal-conditioning module 40. The signal-conditioning module 40 may condition or process voltage and current output from the battery 32 to provide desired power characteristics. For example, in selected embodiments, the signal-conditioning module 40 may provide consistent power, uninterrupted power, prevent undesired power surges, and the like. In selected embodiments, the signal conditioning-module 40 may include various recesses 41 or compartments 41 housing various electronic components to provide the functionality of the signal-conditioning module 40.

In selected embodiments, power from the battery 32 may be transferred to other downhole tools 10 by way of transmission elements 42a, 42b, located on primary or secondary shoulders of the pin end 12 or box end 13 of a downhole tool 10. In selected embodiments, power may be transmitted by direct electrical contact with corresponding transmission elements located on other downhole tools 10 connected in series along a drill string. In other embodiments, electrical power received from the battery 32 may be converted by induction to magnetic energy to bridge the gap between downhole tools 10. The magnetic energy may then be detected and converted back to an electrical signal.

Figure 8:
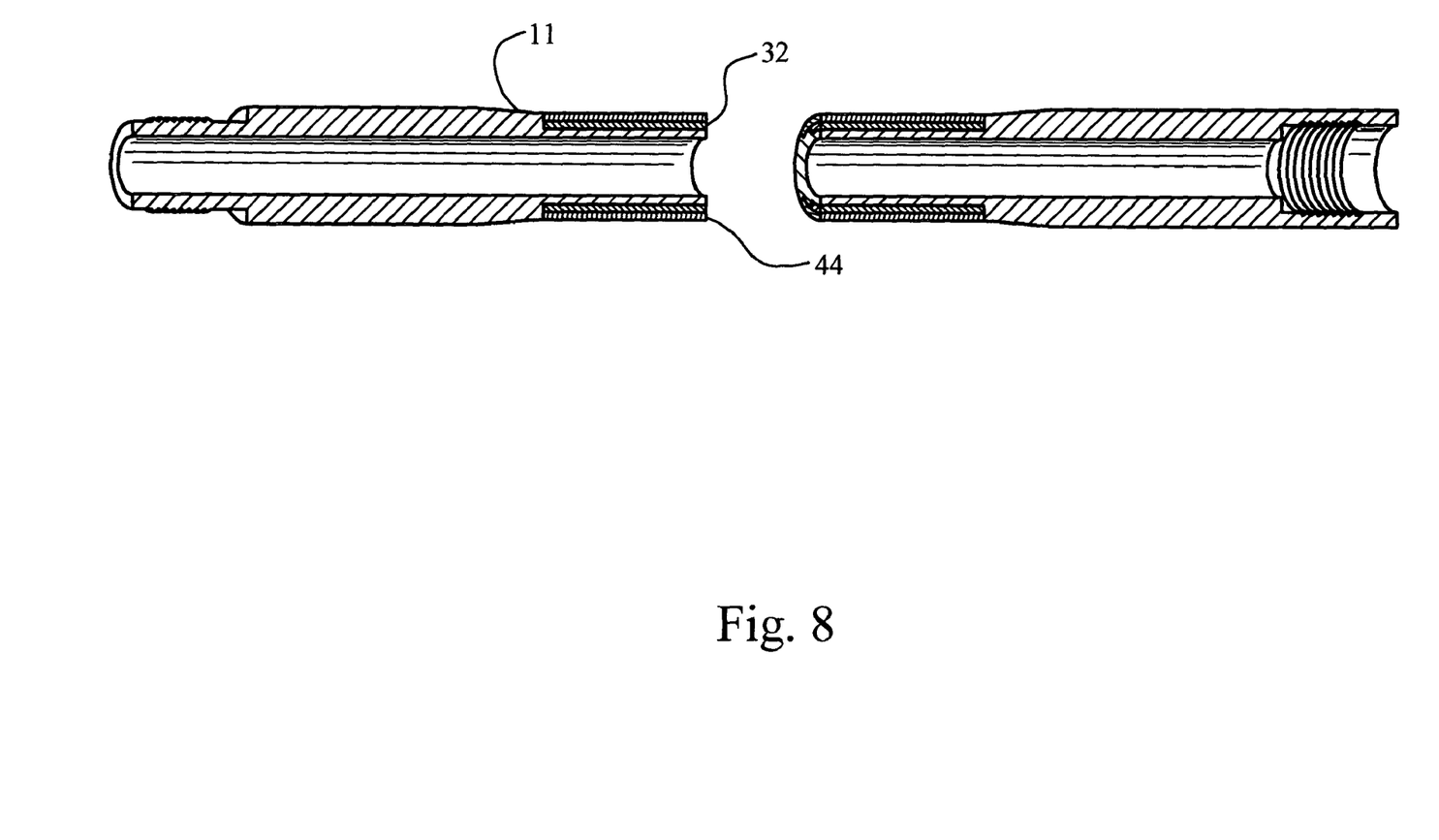
FIG. 8 is a perspective cross-sectional view illustrating one embodiment of a battery having a semi-cylindrical shape installed into the annular structure of a downhole tool.

Referring to FIG. 8, in selected embodiments, a semi-cylindrical battery 32 such as that illustrated in FIG. 5, may be installed into the outer wall 11 of a downhole tool 10. For example, recesses may be formed or milled into the outside or inside diameter of a downhole tool 10 to house the battery 32. One or several batteries 32 may be inserted into these recesses and may be covered by a cover plate 44 or other suitable protective covering 44. The recesses may be formed or milled into the downhole tool 10, such as to not overly weaken or compromise the strength of the downhole tool 10.

Although not illustrated, other recesses may be provided in the wall of the tool 10 to house signal conditioning or other equipment to provide desired power characteristics. The cover plate 44 or material 44 may be sufficiently resilient to withstand the hostile environment downhole, while still enabling pressure from the downhole environment to be transmitted to the battery 32.

Figure 9:
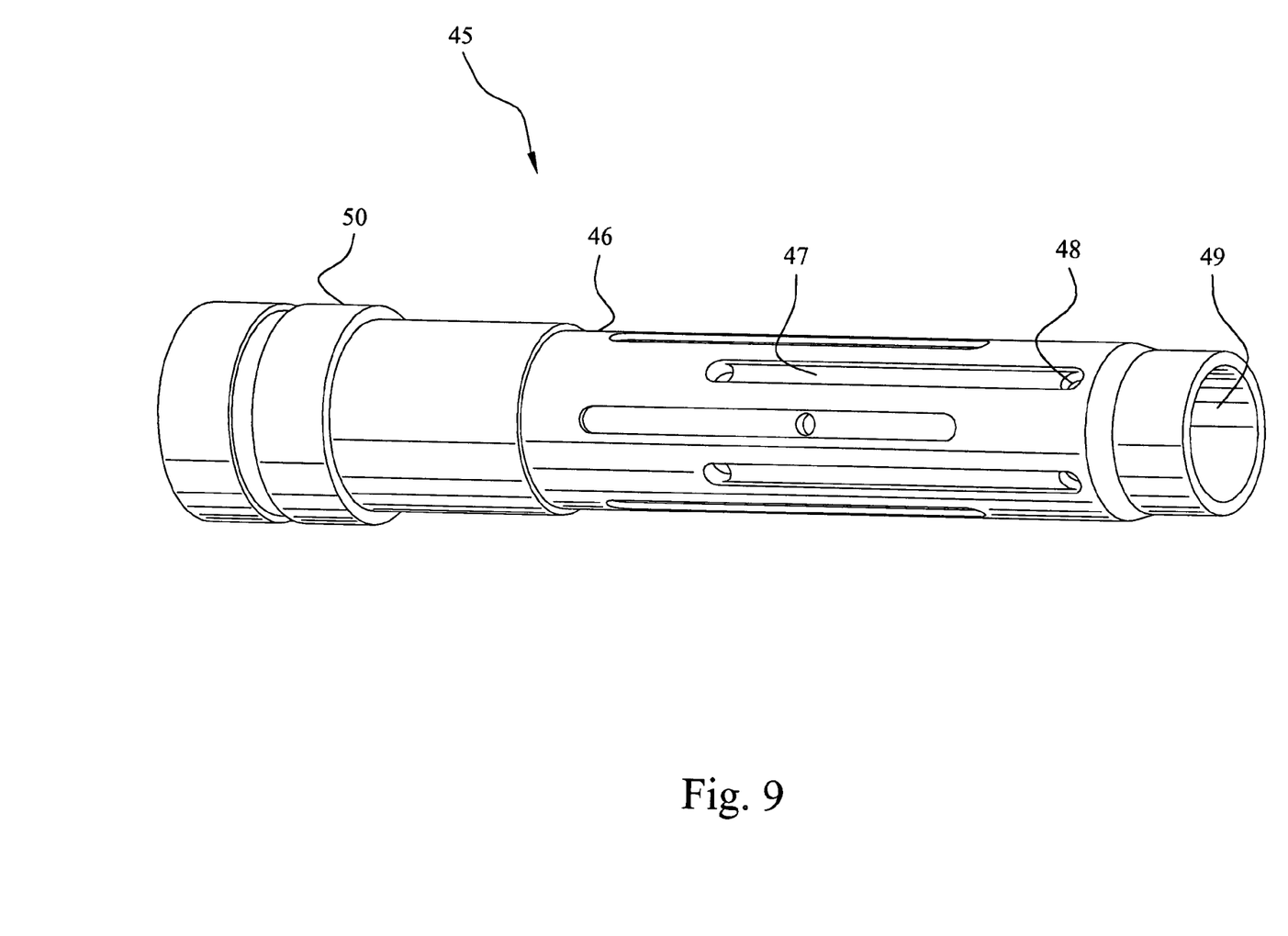
FIG. 9 is a perspective view illustrating one embodiment of a battery insert that may be installed or inserted into another downhole tool.

Referring to FIG. 9, in selected embodiments, a tool insert 45 containing one or several batteries 32 may be provided for insertion into another downhole tool 10. The insert 45 may include an inside diameter sufficiently large to not overly impede or restrict the flow of mud or other drilling fluids passing therethrough. The insert 45 may include various surfaces 46, 50 of differing diameters to fit and be retained within another downhole tool 10.

In selected embodiments, the insert 45 may include one or several recesses 47 milled into the annular walls of the insert 45. These recesses 47 may house or contain batteries 32 in accordance with the present invention, such as those illustrated in FIG. 6, for example. In selected embodiments, the recesses 47 may include one or several apertures 48 opening into the inside diameter 49 of the insert 45. These apertures 48 may provide communication with mud or other drilling fluids traveling through the inside diameter 49, thereby enabling the transfer of pressure to batteries 32 contained within the recess 47 or recesses 47.

In selected embodiments, a diaphragm, membrane, or other resilient and flexible material may be inserted into the apertures 48 in order to seal and protect batteries 32 contained in the recesses 47 from contamination from mud or other drilling fluids circulated through the bore 49. Thus, batteries 32 contained in the recesses 47 may be pressurized using pressures experienced downhole to increase the thermal range of the batteries 32.

The present invention may be embodied in other specific forms without departing from its essence or essential characteristics. The described embodiments are to be considered in all respects only as illustrative, and not restrictive. The scope of the invention is, therefore, indicated by the appended claims, rather than by the foregoing description. All changes within the meaning and range of equivalency of the claims are to be embraced within their scope.

What is claimed and desired to be secured by United States Letters Patent is:

1. A pressure-balanced battery disposed within an insert positioned within a downhole tool, the battery being for powering downhole drilling components in a subterranean environment, the pressure-balanced battery comprising: a battery; and a housing enclosing and sealing a volume containing the battery, the housing being expandable and contractible to balance pressure internal to the housing with pressure external to the housing; and the insert comprising an inside diameter adapted for passage of drilling fluids; the battle being disposed within a recess formed in an annular wall of the insert, and at least one aperture formed in the inside diameter leading to the recess; the apertures being adapted to allow the drilling fluid to pressurize the batteries disposed within the recess.

2. The pressure-balanced battery of claim 1, wherein the housing is in operable communication with downhole fluids.

3. The pressure-balanced battery of claim 1, wherein the housing is integrated into the annular structure of a downhole tool.

4. The pressure-balanced battery of claim 1, wherein at least a portion of the housing is at least one of machined, milled, cast, and forged into a downhole tool.

5. The pressure-balanced battery of claim 1, wherein the battery comprises a plurality of cells electrically connected in at least one of series, parallel, and a combination thereof, within the housing.

6. The pressure-balanced battery of claim 1, further comprising at least one battery terminal, connected to the battery, accessible through an opening in the housing.

7. The pressure-balanced battery of claim 1, wherein the battery comprises an electrolyte selected from the group consisting of a fluid electrolyte and a solid electrolyte.

8. The pressure-balanced battery of claim 1, wherein the battery is a fuel cell.

9. The pressure-balanced battery of claim 1, wherein the battery further comprises a plurality of components held together by a flexible casing, wherein the shape of the flexible casing is selected from the group consisting of a substantially planar shape, a substantially cylindrical shape, and a substantially semi-cylindrical shape.

10. The pressure-balanced battery of claim 1, wherein the battery is installed into at least one recess formed in the wall of a downhole tool.

11. The pressure-balanced battery of claim 1, wherein the battery is in operable communication with at least one of the group consisting of a downhole network, other downhole tools, and transmission elements configured to transmit information between downhole tools.

12. The pressure-balanced battery of claim 1, further comprising a signal-conditioning module to modify characteristics of power output from the battery.

13. The pressure-balanced battery of claim 1, wherein the battery is rechargeable.

14. A pressure-balanced battery disposed within an insert positioned within a downhole tool, the battery being for powering downhole drilling components in a subterranean environment, the pressure-balanced battery comprising: a battery; and a housing enclosing and sealing a volume containing the battery, the housing comprising: a substantially rigid portion; a resilient portion deformable to vary the volume of the housing, the resilient portion balancing pressure internal to the housing with ambient pressure external to the housing; and the insert comprising an inside diameter adapted for passage of drilling fluids; the battery being disposed within a recess formed in an annular wall of the insert, and at least one aperture formed in the inside diameter leading to the recess; the apertures being adapted to allow the drilling fluid to pressurize the batteries disposed within the recess.

15. The pressure-balanced battery of claim 14, wherein the resilient portion is in operable communication with downhole fluids.

16. The pressure-balanced battery of claim 14, wherein the housing is integrated into the annular structure of a downhole tool.

17. The pressure-balanced battery of claim 14, wherein the rigid portion is at least one of machined, milled, cast, and forged into the structure of a downhole tool.

18. The pressure-balanced battery of claim 14, wherein the battery comprises a plurality of cells electrically connected in at least one of series, parallel, and a combination thereof, within the housing.

19. The pressure-balanced battery of claim 14, further comprising at least one battery terminal, operably connected to the battery, accessible through an opening in the housing.

20. A method for providing power to downhole drilling components in a subterranean environment, the method comprising: providing a battery disposed within an insert positioned within a downhole tool, the insert comprising an inside diameter adapted for passage of drilling fluids; the battery being disposed within a recess formed in an annular wall of the insert, and at least one aperture formed in the inside diameter leading to the recess; the apertures being adapted to allow the drilling fluid to pressurize the batteries disposed within the recess; providing a housing enclosing and sealing a volume containing the battery, the sealed housing having a resilient portion flexible to vary the volume within the housing; and flexing the resilient portion to balance pressure internal to the housing with pressure external to the housing.

21. The method of claim 20, wherein flexing is actuated by communication between downhole fluids and the resilient portion of the housing.

* * * * *